US009572175B2

(12) United States Patent
Burchill et al.

(10) Patent No.: US 9,572,175 B2
(45) Date of Patent: Feb. 14, 2017

(54) CONDITIONAL TRANSMISSION DEFERRAL FOR DUAL WIRELESS BAND COEXISTENCE

(71) Applicant: Apple Inc., Cupertino, CA (US)

(72) Inventors: William S. Burchill, San Jose, CA (US); Wen Zhao, San Jose, CA (US); Huanyu Chen, Fremont, CA (US); Zhaojun Cheng, Fremont, CA (US); Weiping Dou, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 14/212,334

(22) Filed: Mar. 14, 2014

(65) Prior Publication Data

US 2014/0269562 A1  Sep. 18, 2014

Related U.S. Application Data

(60) Provisional application No. 61/799,802, filed on Mar. 15, 2013.

(51) Int. Cl.
*H04W 72/12* (2009.01)
*H04W 16/14* (2009.01)
*H04W 76/02* (2009.01)

(52) U.S. Cl.
CPC ......... *H04W 72/1215* (2013.01); *H04W 16/14* (2013.01); *H04W 76/025* (2013.01)

(58) Field of Classification Search
CPC .. H04W 72/1215; H04W 16/14; H04W 36/28; H04W 76/02; H04W 88/06; H04W 76/025
See application file for complete search history.

(56) References Cited

U.S. PATENT DOCUMENTS

| 6,138,010 | A | * | 10/2000 | Rabe et al. | 455/426.1 |
| 6,157,616 | A | * | 12/2000 | Whitehead | 370/252 |
| 8,325,657 | B2 | * | 12/2012 | Fox et al. | 370/329 |
| 2012/0243473 | A1 | | 9/2012 | Kadous et al. | |
| 2013/0003671 | A1 | | 1/2013 | Wang et al. | |
| 2013/0272260 | A1 | * | 10/2013 | Bitran et al. | 370/329 |
| 2013/0324112 | A1 | * | 12/2013 | Jechoux et al. | 455/426.1 |

FOREIGN PATENT DOCUMENTS

WO  2013032381 A1  3/2013

* cited by examiner

*Primary Examiner* — Ayaz Sheikh
*Assistant Examiner* — Debebe Asefa
(74) *Attorney, Agent, or Firm* — Meyertons, Hood, Kivlin, Kowert & Goetzel, P.C.

(57) ABSTRACT

A wireless communication system is presented for multiple wireless technology coexistence in a mobile device. A method according to this application might include obtaining one or more transmit allocation parameters for a wireless transmission via a first radio technology at a first wireless processor and the preparing to receive wireless data via a second radio technology at a second wireless processor. Next, the exemplary method might request that the wireless transmission be deferred, followed by deciding whether to grant the deferral request based at least on the one or more transmit allocation parameters.

20 Claims, 9 Drawing Sheets

CONDITIONAL TRANSMISSION DEFERRAL FOR DUAL WIRELESS BAND COEXISTENCE

PRIORITY

This application claims the benefit of priority from U.S. Provisional Patent Application Ser. No. 61/799,802, entitled "Conditional Deference for Dual Wireless Band Coexistence" and filed on Mar. 15, 2013, which is fully incorporated herein by reference for all purposes and to the extent not inconsistent with this application.

BACKGROUND

Field of the Application

The disclosure is directed to wireless communications and, more particularly, to conditional deference for dual wireless band (e.g., cellular and ISM band) coexistence in wireless communications.

Background of the Disclosure

Wireless communication systems are widely deployed to provide various communication services, such as: voice, video, packet data, circuit-switched info, broadcast, messaging services, and so on. A typical wireless communication system, or network, can provide multiple users access to one or more shared resources (e.g., bandwidth, transmit power, etc.). These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems and Orthogonal Frequency Division Multiple Access (OFDMA) systems.

Generally, a wireless multiple-access communication system can simultaneously support communication for multiple wireless devices or terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), single-in-multiple-out (SIMO), multiple-in-signal-out (MISO), or a multiple-in-multiple-out (MIMO) system.

For instance, a MIMO system can employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels can correspond to a dimension. The MIMO system can provide improved performance (e.g., higher throughput and/or greater reliability) if the additional dimensionalities created by the multiple transmit and receive antennas are utilized.

A MIMO system can support a time division duplex (TDD) and frequency division duplex (FDD) systems. In an FDD system, the transmitting and receiving channels are separated with a guard band (some amount of spectrum that acts as a buffer or insulator), which allows two-way data transmission by, in effect, opening two distinct radio links. In a TDD system, only one channel is used for transmitting and receiving, separating them by different time slots. No guard band is used. This can increase spectral efficiency by eliminating the buffer band and can also increase flexibility in asynchronous applications. For example, if less traffic travels in the uplink, the time slice for that direction can be reduced, and reallocated to downlink traffic.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

With the proliferation of wireless communication systems and providers, including individuals providing their own networks, wireless devices are regularly located within two or more systems at one time. Thus, wireless devices can be designed to communicate with multiple wireless communication systems at the same time. Such devices may include multiple antenna and associated radio/processing circuitry for transmitting/receiving on multiple systems, potentially at the same time. In such instances, it is possible that the transmission from the wireless device on one wireless access network might interfere with the simultaneous, attempted reception by the wireless device on another wireless access network.

Therefore, what are needed are techniques for better managing the coexistence of a wireless device on multiple, disparate wireless communication systems, for example, during simultaneous transmission(s) and/or reception(s) on these different wireless access networks.

DETAILED DESCRIPTION

The following detailed description is directed to certain sample embodiments. However, the disclosure can be embodied in a multitude of different ways as defined and covered by the claims. In this description, reference is made to the drawings wherein like parts are designated with like numerals within this application.

Various techniques described herein can be used with one or more of various wireless communication systems, such as Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. Wireless communication systems employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11 ("Wi-Fi"), IEEE 802.16 "(WiMAX"), IEEE 802.20 ("MBWA"), Flash-OFDM.RTM., etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1×RTT, 1×EV-DO Re10, RevA, RevB) technology and other technologies, such as Wi-Fi, WiMAX, WMBA and the like.

This disclosure makes reference to various wireless communication terminologies, such as access point, uplink (UL), mobile device, base station, downlink (DL), user equipment (UE), Node B (NB), forward link, access terminal (AT), reverse link and enhanced NB (eNB). The use (or lack thereof) of these and other names for various parts of a wireless communication system is not intended to indicate or mandate one particular device, one particular standard or protocol, or one particular signaling direction. The use (or lack thereof) of these and other names is strictly for descriptive convenience and such names may be interchanged within this application without any loss of coverage or rights.

Figure 1:
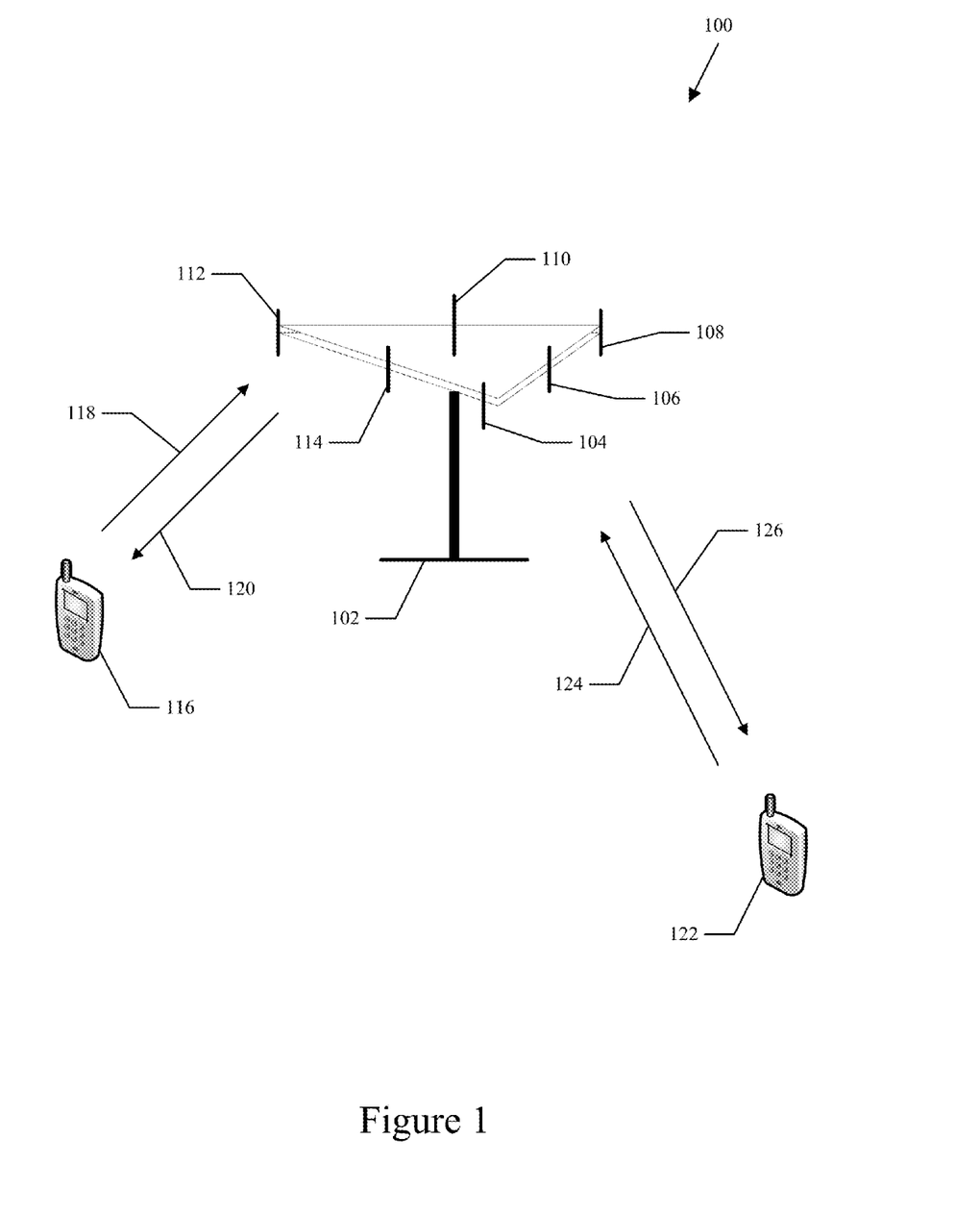
FIG. 1 illustrates an exemplary wireless multiple-access communication system according to certain embodiments.

Referring now to the drawings, FIG. 1 illustrates an exemplary wireless multiple-access communication system 100 according to certain embodiments. In one example, an enhanced Node B (eNB) base station 102 includes multiple antenna groups. As shown in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. As shown, user equipment (UE) 116 can be in communication with antennas 112 and 114, where antennas 112 and 114 transmit information to UE 116 over downlink (or forward link) 120 and receive information from UE 116 over uplink (or reverse link) 118. Additionally and/or alternatively, UE 122 can be in communication with antennas 104 and 106, where antennas 104 and 106 transmit information to UE 122 over downlink 126 and receive information from US 122 over uplink 124. In a frequency division duplex (FDD) system, communication links 118, 120, 124 and 126 can use different frequency for communication. In time division duplex (TDD) systems, the communication links can use the same frequency for communication, but at differing times.

Each group of antennas and/or the area in which they are designed to communicate can be referred to as a sector of the eNB or base station. In accordance with one aspect, antenna groups can be designed to communicate to mobile devices in a sector of areas covered by eNB 102. In communication over downlinks 120 and 126, the transmitting antennas of eNB 102 can utilize beamforming in order to improve the signal-to-noise ratio of downlinks for the different UEs 116 and 122. Also, a base station using beamforming to transmit to UEs scattered randomly through its coverage causes less interference to mobile devices in neighboring cells than a base station transmitting through a single antenna to all its UEs. In addition to beamforming, the antenna groups can use other multi-antenna or antenna diversity techniques, such as spatial multiplexing, spatial diversity, pattern diversity, polarization diversity, transmit/receive diversity, adaptive arrays, and the like.

Figure 2:
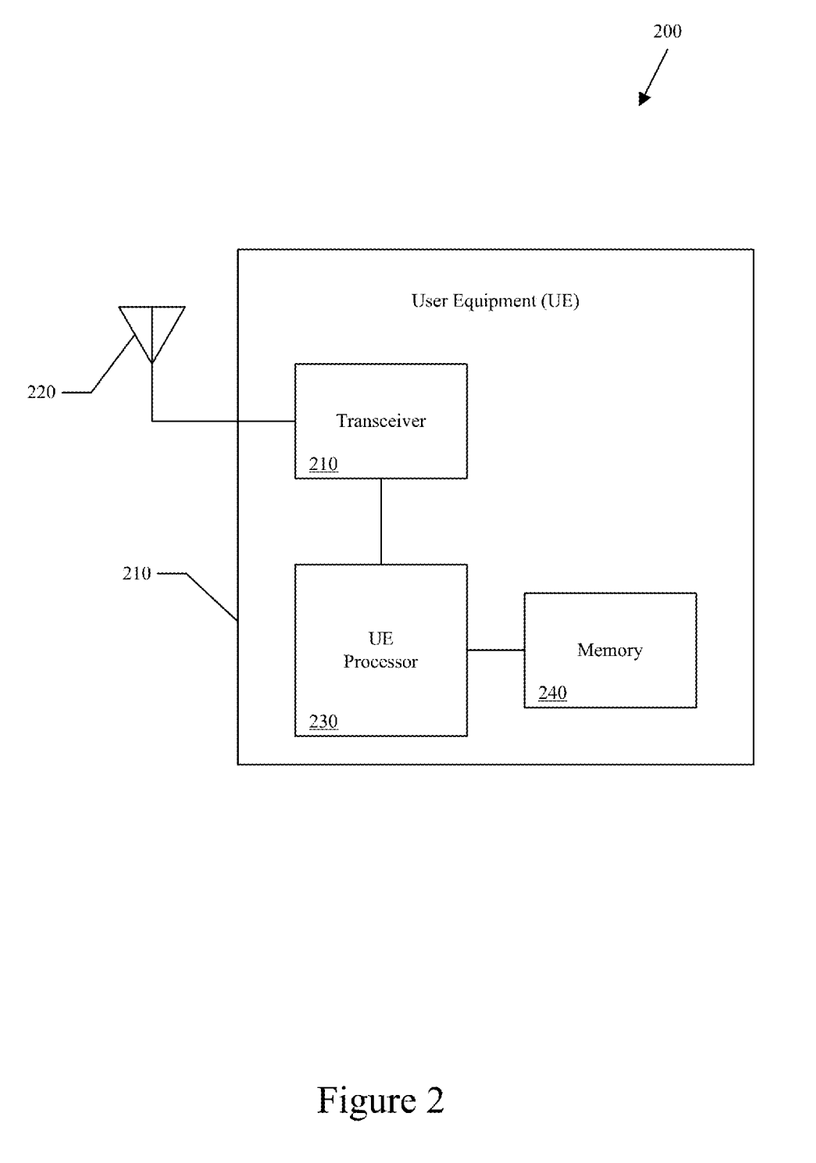
FIG. 2 illustrates a block diagram of an exemplary mobile device or user equipment (UE) according to certain embodiments.

FIG. 2 illustrates a block diagram 200 of an exemplary mobile device or user equipment (UE) 210 according to certain embodiments. As shown in FIG. 2, UE 210 may include a transceiver 210, an antenna 220, a processor 230, and a memory 240 (which, in certain embodiments, may include memory in a Subscriber Identity Module (SIM) card). In certain embodiments, some or all of the functionalities described herein as being performed by mobile communication devices may be provided by processor 230 executing instructions stored on a computer-readable medium, such as the memory 240, as shown in FIG. 2. Additionally, UE 210 may perform uplink and/or downlink communication functions, as further disclosed herein, via transceiver 210 and antenna 220. While only one antenna is shown for UE 210, certain embodiments are equally applicable to multi-antenna and possibly multi-transceiver mobile devices, which may be used for communicating with one wireless or multiple wireless systems, either serially or in parallel (e.g., simultaneously). In certain embodiments, UE 210 may include additional components beyond those shown in FIG. 2 that may be responsible for enabling or performing the functions of UE 210, such as communicating with a base station in a network and for processing information for transmitting or from reception, including any of the functionality described herein. Such additional components are not shown in FIG. 2 but are intended to be within the scope of coverage of this application.

Figure 3:
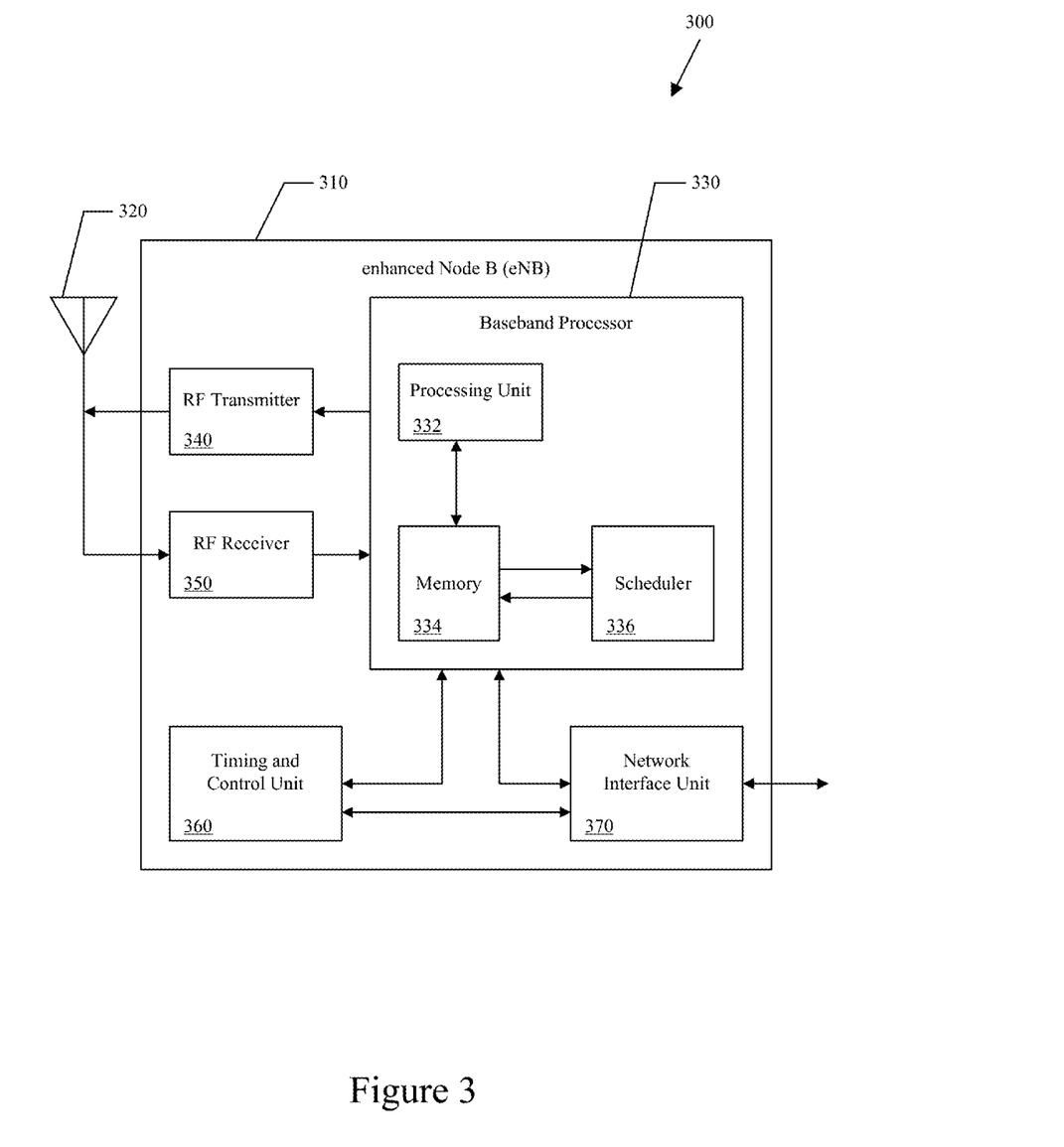
FIG. 3 illustrates a block diagram of an exemplary enhanced Node B (eNB) or similar mobile communication node (e.g., base station, access point, etc.) according to certain embodiments.

FIG. 3 illustrates a block diagram 300 of an exemplary enhanced Node B (eNB) 310 or similar mobile communication node (e.g., base station, access point, etc.) according to certain embodiments. As shown in FIG. 3, eNB 310 may include a baseband processor 310 to provide radio communication with mobile handsets via a radio frequency (RF) transmitter 340 and RF receiver 330 units coupled to the eNB antenna 320. While only one antenna is shown, certain embodiments are applicable to multi-antenna configurations. RF transmitter 340 and RF receiver 330 may be combined into one, transceiver unit, or duplicated to facilitate multiple antenna connections. Baseband processor 320 may be configured (in hardware and/or software) to function according to a wireless communications standard, such as 3GPP LTE. Baseband processor 320 may include a processing unit 332 in communication with a memory 334 to process and store relevant information for the eNB and a scheduler 336, which may provide scheduling decisions for mobile devices serviced by eNB 310. Scheduler 336 may have some or all of the same data structure as a typical scheduler in an eNB in an LTE system.

Baseband processor 330 may also provide additional baseband signal processing (e.g., mobile device registration, channel signal information transmission, radio resource management, etc.) as required. Processing unit 332 may include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Some or all of the functionalities described herein as being provided by a mobile base station, a base station controller, a node B, an enhanced node B, an access point, a home base station, a femtocell base station, and/or any other type of mobile communications node may be provided by processing unit 332 executing instructions stored on a computer-readable data storage medium, such as the memory 334 shown in FIG. 3.

In certain embodiments, eNB 310 may further include a timing and control unit 360 and a core network interface unit 370, such as are shown in FIG. 3. Timing and control unit 360 may monitor operations of baseband processor 330 and network interface unit 370, and may provide appropriate timing and control signals to these units. Network interface unit 370 may provide a bi-directional interface for eNB 310 to communicate with a core or back-end network (not shown) to facilitate administrative and call-management functions for mobile subscribers operating in the network through eNB 310.

Certain embodiments of the base station 310 may include additional components responsible for providing additional functionality, including any of the functionality identified herein and/or any functionality necessary to support the solution described herein. Although features and elements are described in particular combinations, each feature or element can be used alone without the other features and elements or in various combinations with or without one or more features and elements. Methodologies provided herein may be implemented in a computer program, software, or firmware incorporated in a computer-readable storage medium (e.g., memory 334 in FIG. 3) for execution by a general purpose computer or a processor (e. g., processing unit 332 in FIG. 3). Examples of computer-readable storage media include read only memory (ROM), random access memory (RAM), digital registers, cache memory, semiconductor memory devices, magnetic media such as internal hard disks, magnetic tapes and removable disks, magneto-optical media, and optical media such as CDROM disks, digital versatile disks (DVDs), and so on.

Figure 4:
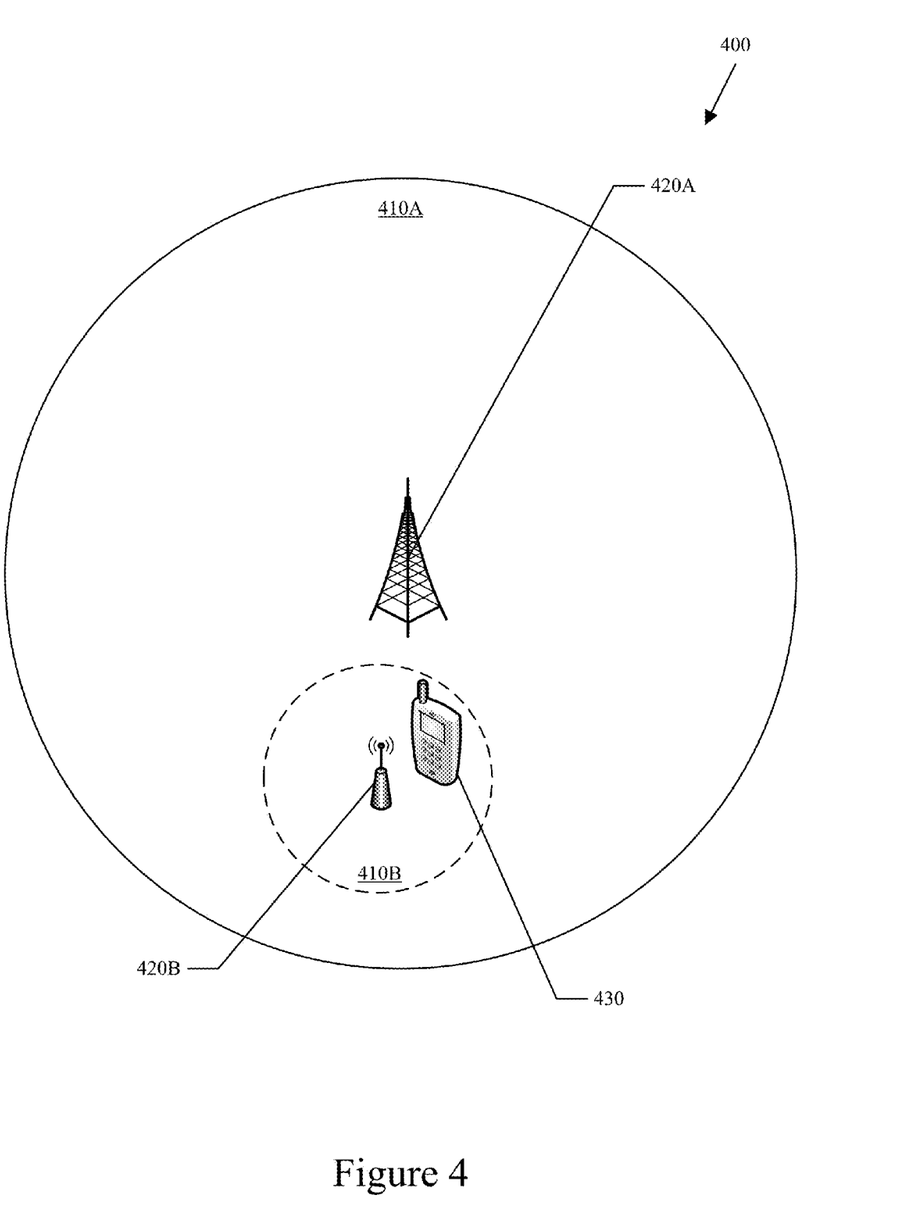
FIG. 4 illustrates an exemplary multi-network wireless communication system according to certain embodiments.

FIG. 4 illustrates an exemplary multi-network wireless communication system 400 according to certain embodiments. As shown in FIG. 4, a mobile device (handset, UE, etc.) 430 is within the coverage area of two wireless systems 410A, 410B; of course there could be more. In FIG. 4, for example, wireless system 410A might be an LTE system that uses an enhanced Node B (eNB) 420A to communicate with wireless device 430. Likewise, wireless system 410B might be a Wi-Fi network that uses an access point (AP) to communication with wireless device 430. Wireless systems 410A, 410B may be other communication protocols / standards as well. Mobile device 430 can include a separate antenna (not shown) for each of wireless systems 410A, 410B, which creates in mobile device 430 the ability to, for example, transmit on wireless system 410A (e.g., the LTE network) at the same time it is receiving on wireless system 410B (e.g., the Wi-Fi network). When this occurs, the transmission on wireless system 410A can interfere with the reception on wireless system 410B, causing mobile device 430 to fail in receiving the wireless system 410B information. While this application may make reference to specific wireless networks and/or communication protocols/standards, the disclosure is intended to be generally applicable to all dual (or more) wireless communication systems/networks/protocols/standards.

Figure 5:
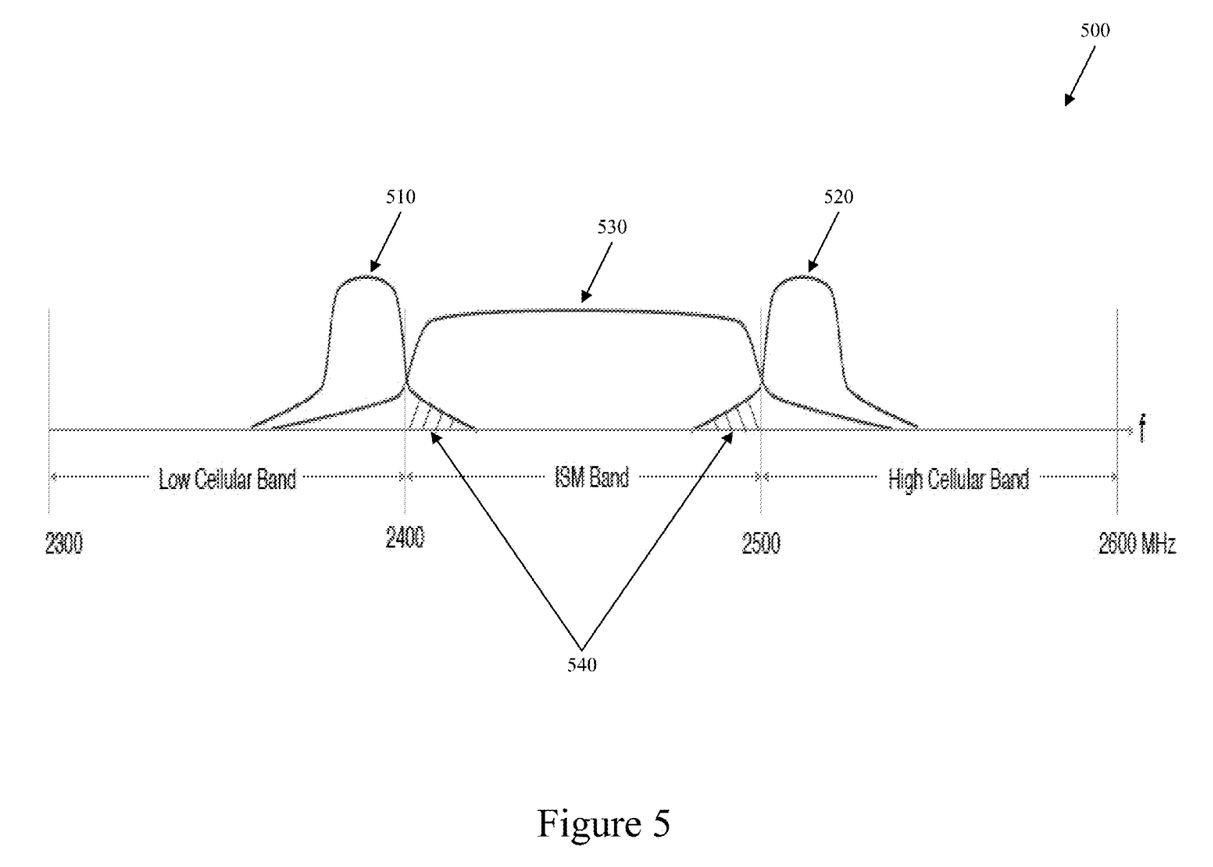
FIG. 5 illustrates an exemplary multi-network, adjacent channel interference frequency profile according to certain embodiments.

FIG. 5 illustrates an exemplary multi-network, adjacent channel interference frequency profile 500 according to certain embodiments. As shown in FIG. 5, frequency (f) is provided along the horizontal axis (e.g., the y-axis) and (not-to-scale) signal power or strength is provided along the vertical axis (e.g., the x-axis). Two wireless networks are illustrated, a cellular system with a low cellular band profile 510 and a high cellular band profile 520 and an industrial, scientific and medical (ISM) system with an ISM band profile 530. These bands could be, for example: LTE band 40 for the low cellular band, LTE band 7 for the high cellular band and Wi-Fi for the ISM band. As used herein, the ISM radio bands are radio bands reserved internationally for industrial, scientific and medical purposes. However, despite the intent of the original allocations for these ISM purposes, the fastest-growing uses of the ISM bands have been for short-range, low power communications systems, such as: cordless phones, Bluetooth devices, near field communication (NFC) devices, and other wireless computer networks (e.g., Wi-Fi).

In certain embodiments, low and/or high cellular band profiles 510, 520, as shown in FIG. 5, may indicate a transmission by a mobile device, while the ISM band profile 530 might indicate a reception at the mobile device. Note that the power levels or signal strengths shown in FIG. 5 are not to scale, but are for illustrative purposes only. In practice, the LTE transmit power can be many orders of magnitude greater than the received Wi-Fi signal strength. The low and/or high cellular bands can be adjacent or nearly adjacent to the edges of the Wi-Fi band. Thus, the tails of each frequency band can bleed over or leak into the neighboring bands. The crosshatching shown in FIG. 5 illustrates the leakage 540 of the low and/or high cellular bands in the Wi-Fi band. Leakage 540, when as mentioned above the LTE transmit power is orders of magnitude greater than the Wi-Fi received signal strength, can cause the mobile device to fail when trying to receive the Wi-Fi signal (i.e., the UE LTE transmission can cause Wi-Fi reception failure).

Figure 6:
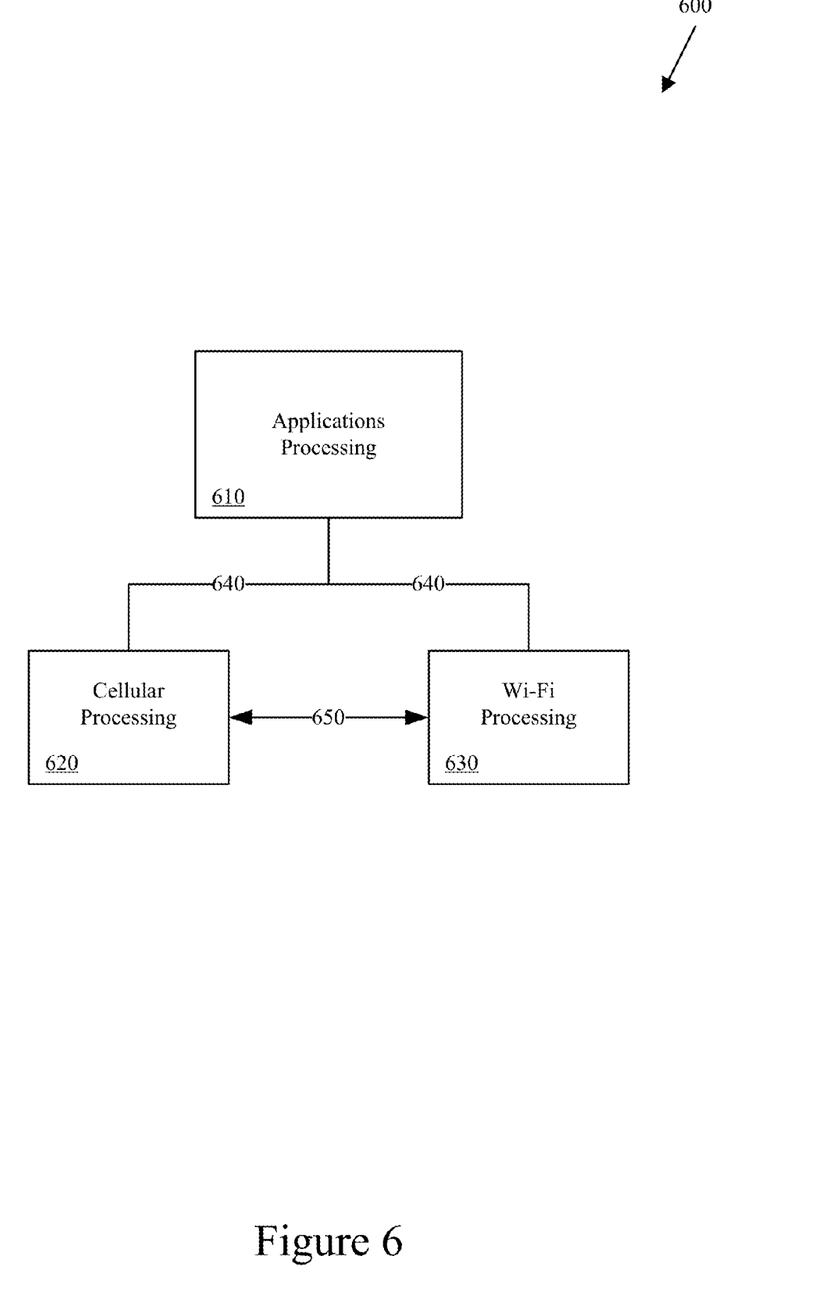
FIG. 6 illustrates an exemplary general mobile device architecture for handling multi-network wireless communications according to certain embodiments.

FIG. 6 illustrates an exemplary general mobile device architecture 600 for handling multi-network wireless communications according to certain embodiments. As shown in FIG. 6, UE architecture 600 can include application processing 610, coupled via a bus 640 to cellular processing 620 and Wi-Fi processing 630. Each of the processing blocks in FIG. 6 can include a separate processor chip with integrated and/or stand-alone memory, and/or two or more of the processing blocks can be combined together into one processor chip with integrated and/or stand-alone memory. If combined into one processor chip, then bus 640 may be completely internal to that one processor chip. For example, processing blocks 610, 620, 630 can be implemented in UE processor 230 as shown in FIG. 2, or application processing 610 may be implemented in UE processor 230, with cellular processing 620 and Wi-Fi processing 630 being implemented in one or two separate chips (not shown in FIG. 2) coupled to UE processor 230.

Referring back to FIG. 6, the actions of cellular processing 620 and Wi-Fi processing 630 can be controlled or directed by applications processing 610. For example, applications processing 610 could instruct a cellular call via cellular processing 620, while at the same time instruct a file download via Wi-Fi processing 630. Likewise, cellular processing 620 and Wi-Fi processing 630 can report call and/or data traffic status and/or settings to applications processing 610. Also, cellular processing 620 can be connected to Wi-Fi processing 630 via a cell-ISM link 650. In certain embodiments, cell-ISM link 650 can be a higher-speed, more effective communication link between cellular processing 620 and Wi-Fi processing 630 than having to communicate via bus 640 (e.g., milliseconds or less vs. microseconds or more) and applications processing 610. Cell-ISM link 650 can allow cellular processing 620 and Wi-Fi processing 630 to communicate in a more meaningful way relative to the speed with which each communicates with outside networks (not shown). For example, if Wi-Fi processing 630 were trying to receive high priority information, it could send a message to cellular processing 620 via cell-ISM link 650 advising cellular processing 620 that the Wi-Fi priority activity requires protection from cellular transmissions, and because of the higher-speed of cell-ISM link 650, cellular processing 620 could have time to react to the Wi-Fi message in a way that could protect the Wi-Fi reception from being interfered with by an upcoming cellular transmission.

In certain embodiments, when cellular processing 620 is presented with such a request or message from Wi-Fi processing 630 via cell-ISM link 650, one basic protection that cellular processing 620 could offer Wi-Fi processing is to not transmit at all during the interval in which Wi-Fi processing 630 is attempting reception of the high priority information. However, there could be several potential problems with deferring all cellular processing 620 scheduled transmissions whenever Wi-Fi processing 630 requests. One potential problem is that some cellular transmission are also of high importance and if not made could cause the network to drop the device from active service. Another potential problem is that, even if not of high importance, the deferred (i.e., aborted) cellular transmissions must be replaced at some point in the future by one or more retransmissions. The retransmissions could themselves be in conflict with future Wi-Fi high priority receptions. This cycle of deferred transmissions by cellular processing 620 reduces the probability of success for those cellular transmissions. Even when the retransmissions are ultimately successful, the system capacities and efficiencies, including those of cellular processing 620, are reduced.

As previously stated, certain embodiments of this application are disclosed in terms of an LTE transmission coexisting with a Wi-Fi reception in a wireless device, along with possible options for managing that coexistence. However, techniques and devices described herein are not intended to be so limited. Those skilled in the art, after learning from this disclosure, will appreciate the general scope of coverage of this application, which is captured in the scope of the claims.

LTE uplink (UL) transmissions can vary dramatically in the extent to which they might harm Wi-Fi receptions, especially when they coexist on the same wireless device. This is because LTE UL allocations can vary on a millisecond by millisecond basis in their power levels, bandwidths, and starting positions (e.g., frequency, etc.) in the LTE channel. For some specific hardware architecture, it might be possible to quantify, and therefore predict, how harmful a given LTE UL allocation will be to a given Wi-Fi reception (e.g., current and/or future Wi-Fi receptions and/or LTE UL transmissions). Harm predictions, such as those described in this application, can be devised to characterize an LTE allocation in real-time or near real-time (e.g., milliseconds or faster basis).

Figure 7:
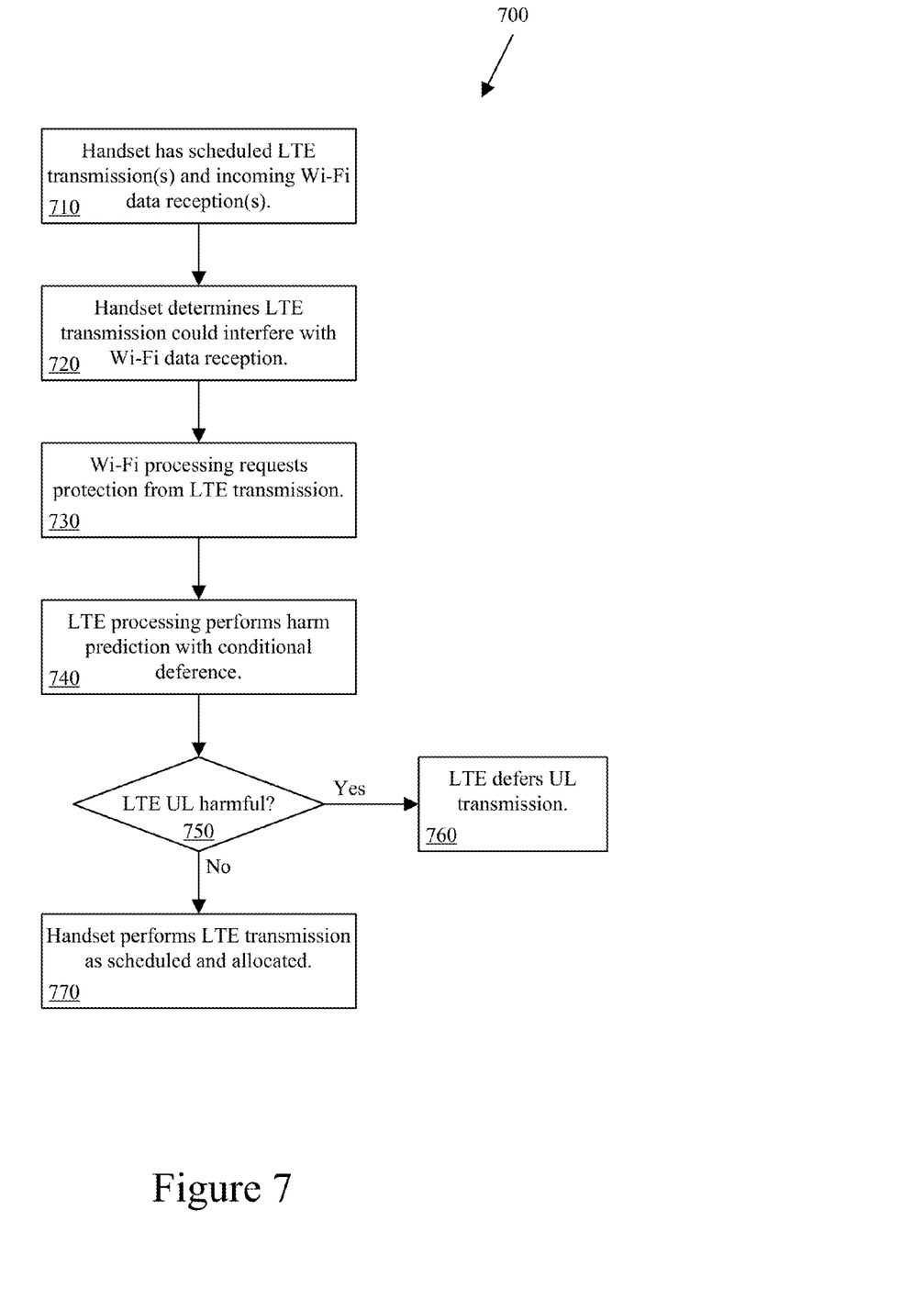
FIG. 7 illustrates an exemplary LTE/Wi-Fi coexistence management flowchart according to certain embodiments.

FIG. 7 illustrates an exemplary LTE/Wi-Fi coexistence management flowchart 700 according to certain embodiments. At 710, a handset (e.g., 116 or 122 in FIG. 1, 200 in FIG. 2, 430 in FIG. 4, and so on), has one or more scheduled LTE transmissions and one or more incoming Wi-Fi data receptions. In certain embodiments, applications processing 610 in FIG. 6 can be informed about these by cellular processing 620 and Wi-Fi processing 630, respectively. At 720, the handset determines that one or more scheduled LTE transmissions could interfere with one or more of the Wi-Fi data receptions. This determination could be performed by applications processing 610 in FIG. 6 and communicated to Wi-Fi processing 630 via bus 640, or Wi-Fi processing 630 could make this determination independently.

At step 730, Wi-Fi processing can request protection from the possibly-interfering LTE transmission. This can be performed by Wi-Fi processing 630 communicating the request to cellular processing 620 via cell-ISM link 650. The request can be in the form of a standardized message or can be a design-specific message for this purpose. The message can include information about the impending Wi-Fi reception (e.g., frequency used, duration, etc.) and/or can request specific things of LTE processor (e.g., refrain from transmitting for a specific interval of time or on a specific channel, etc.). At step 740, after receiving the Wi-Fi processing protection request, LTE processing performs harm prediction with conditional deferral (as described in more detail herein).

At step 750, a decision is made as to whether the scheduled LTE transmission (or uplink, UL) will be (or likely to be) harmful to the Wi-Fi data reception for which protection is requested. This determination and decision can be performed by cellular processing 620. At step 760, if the LTE UL is deemed harmful (or likely harmful), then the LTE transmission can be deferred. At step 770, if the LTE UL is deemed not harmful (or unlikely harmful), then the LTE transmission can happen as scheduled and allocated. The transmission or deferral can be facilitated by cellular processing 620. While the steps of FIG. 7 are discussed with reference to specific elements from FIG. 6, this description is for illustrative purposes only and is not meant to limit the scope of this application.

Figure 8:
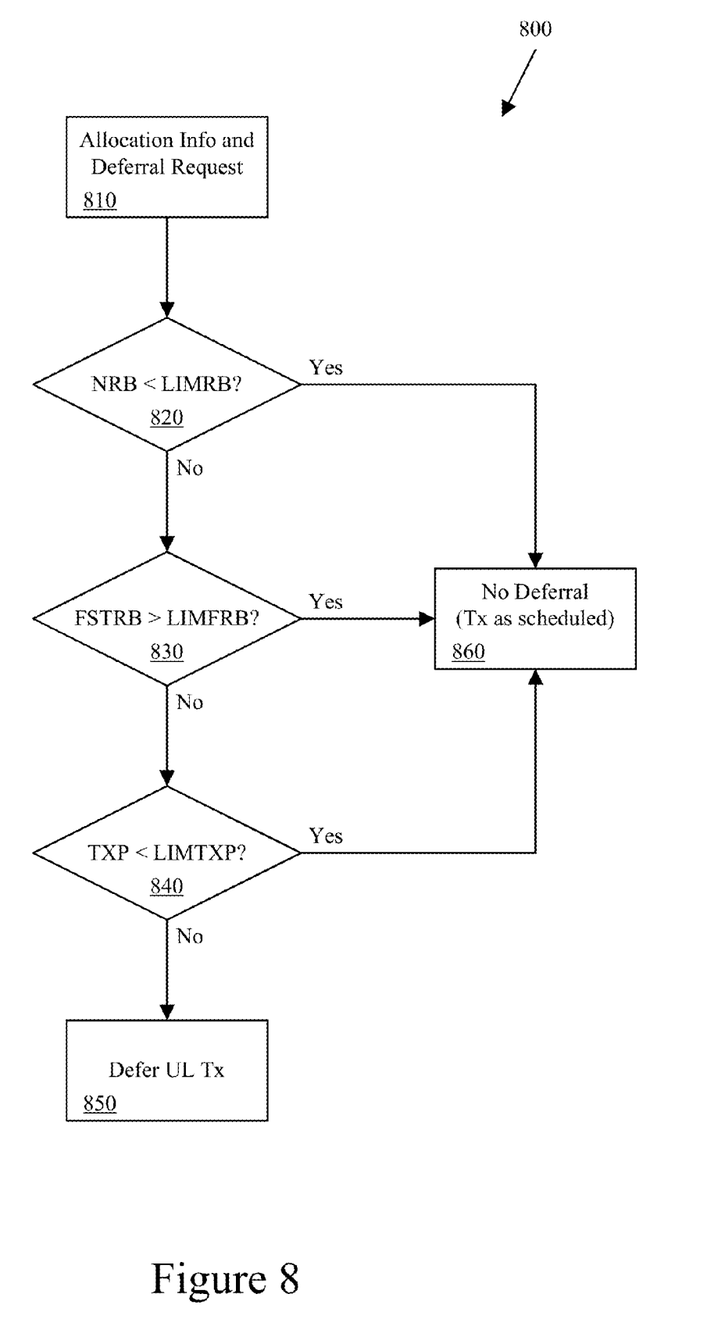
FIG. 8 illustrates an exemplary harm prediction with conditional deferral flowchart according to certain embodiments.

FIG. 8 illustrates an exemplary harm prediction with conditional deferral flowchart 800 according to certain embodiments. Such a flowchart 800, for example, may correspond to steps 740-770 as shown and discussed with reference to FIG. 7 and as illustratively performed by cellular processing 620 of FIG. 6. As shown in FIG. 8, at step 810 LTE processor 620 has allocation information for an upcoming LTE transmission (or uplink, UL) and has received a deferral request relating to that upcoming LTE transmission from, for example, Wi-Fi processor 630. The LTE allocation information can include, for example, a transmit power (TXP), a number of resource blocks (NRB) and a frequency channel for the upcoming LTE UL. Of course, other allocation information may be included. The deferral request could be sent via a high-speed link between LTE processor 620 and Wi-Fi processor 630, for example, via cell-ISM link 650 in FIG. 6, because of the importance, priority, criticality, etc. of the incoming Wi-Fi data about to be received.

In certain embodiments, at steps 820-840, decisions are made to determine whether that particular LTE transmission will be (or likely will be) harmful to the Wi-Fi reception. These decisions, depending on how each is configured, could be in any order and/or processed in a serial or parallel manner. The specific illustration of FIG. 8 is for explanatory purposes only. At step 810, the allocated number of resource blocks (NRB) is compared to a resource block limit (LIMRB). For example, if NRB is less than LIMRB; that is, if the number of allocated resource blocks is below a certain limit on the number of resource blocks, then the LTE transmission does not have to be deferred. Put another way, if the number of allocated resource blocks is low enough, then the LTE transmission will not harm (or likely not harm, based on some safety threshold) the Wi-Fi reception.

Similarly, at step 830, suppose that the LTE frequency allocation is in the lowest frequency channel of the high cellular band (i.e., Band 7). Then, defining the count of the first (lowest frequency) resource block allocation as FSTRB, there can be a limit number for the first RB, LIMFRB (e.g., the limit on the first resource block allocation of Band 7), that can be pre-determined (or in some instance, dynamically determined) such that if FSTRB is greater than LIMFRB, then no deferral of the LTE transmission is necessary. Put another way, if the lowest resource block frequency is greater than some limit on that frequency, then the LTE transmission will not harm (or likely not harm, based on some safety threshold) the Wi-Fi reception.

Likewise, at step 840, there can be a limit on the LTE transmit power (LIMTXP) whereby if the allocated transmit power for the upcoming LTE UL (TXP) is below LIMTXP, then no deferral of the LTE transmission is necessary. Put another way, if the actual, allocated TXP is below some limit (LIMTXP) then the LTE transmission will not harm (or likely not harm, based on some safety threshold) the Wi-Fi reception.

As shown in FIG. 8, at step 860, if any one or more of the limit checks made is below the safety threshold(s) or is determined to not cause harm to the Wi-Fi reception, then no deferral of the LTE transmission will happen. Alternatively, if none of the limit checks is below the safety threshold(s) is determined to cause or likely cause harm to the Wi-Fi reception, then at step 850 the LTE transmission can be deferred.

Figure 9:
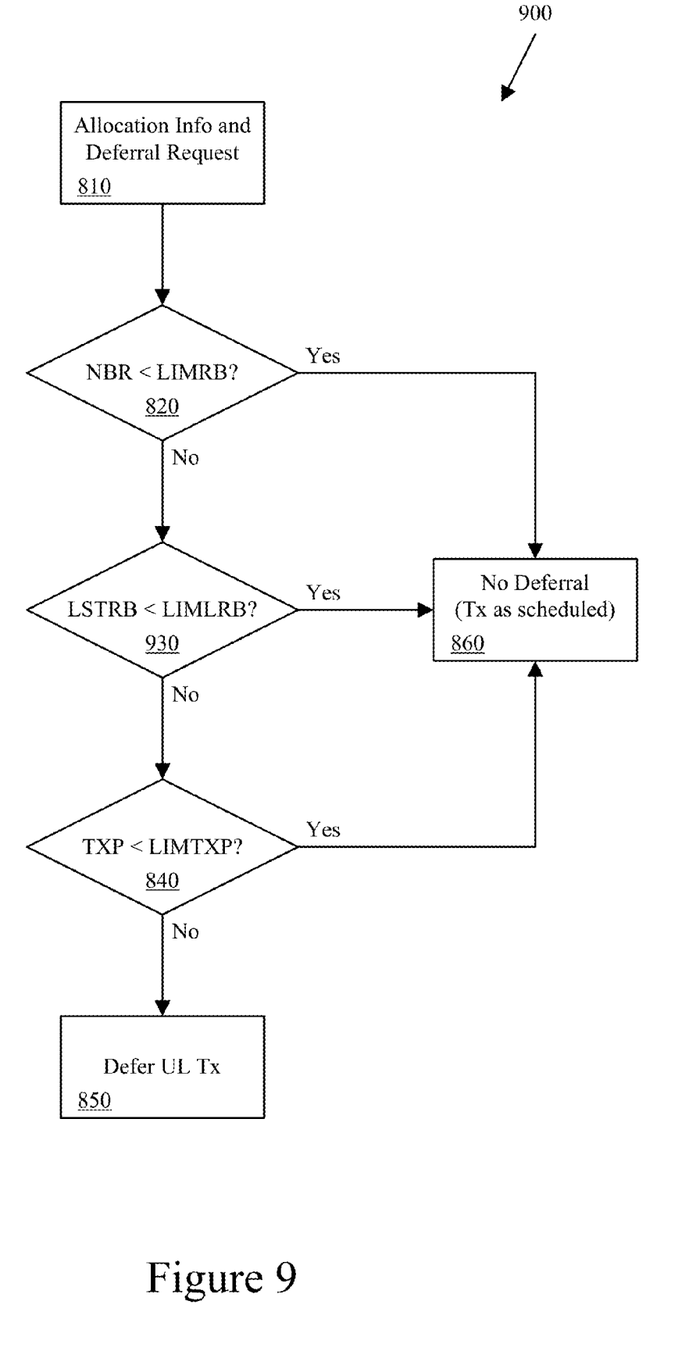
FIG. 9 illustrates an exemplary harm prediction with conditional deferral flowchart according to certain embodiments.

FIG. 9 illustrates an exemplary harm prediction with conditional deferral flowchart 900 according to certain embodiments. As shown in FIG. 9, steps 810-820 and 840-860 are the same as discussed above with reference to FIG. 8. However, step 930 is new to FIG. 9, but generally similar to step 830 of FIG. 8. At step 930, suppose that the LTE frequency allocation is in the highest frequency channel of the low cellular band (i.e., Band 40). Then, defining the count of the last (highest frequency) resource block allocation as LSTRB, there can be a limit number for the last RB, LIMLRB (e.g., the limit on the last resource block allocation of Band 40), that can be pre-determined (or in some instances, dynamically determined) such that if LSTRB is less than LIMLRB, then no deferral of the LTE transmission is necessary. Put another way, if the highest resource block frequency is less than some limit on that frequency, then the LTE transmission will not harm (or likely not harm, based on some safety threshold) the Wi-Fi reception.

As discussed above, each limit and/or threshold can be derived by calculation, experimentation or simulation and/or pre-determined and/or dynamically determined. For example, a test system can be set up such that various LTE transmissions are performed based on many different allocations and then measurements at the Wi-Fi receiver can be performed to determine which allocation factors can negatively affect a Wi-Fi reception to an unacceptable degree (i.e., such that the Wi-Fi reception will fail or likely fail). Then, these limits can be used as described herein for harm prediction with conditional deferral. Additionally, while each limit is discussed in terms of being one number (e.g. a pass/fail criteria), each decision could have three or more paths (e.g., yes, no and other). For example, if three paths were used, the yes and no decisions could have their own limits (i.e., like with hysteresis) and the other path to the next decision could be the in-between, or other, decision. Also, limits can be dynamically adjusted based on equipment and/or environmental variations. Finally, instead of limits, a scoring system can be used for each decision block, where the final deferral/no-deferral decision can be made based on the individual scores of each decision block and/or as a function of those individual scores or some combination of those individual scores (e.g., an additive function for final determination of the deferral/no-deferral decision).

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints or preferences imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in one or more software modules executed by one or more processing elements, or in a combination of the two. A software module may reside in RAM memory, flash memory, ROM memory, EPROM memory, EEPROM memory, registers, hard disk, a removable disk, a CD-ROM, or any other form or combination of storage medium known in the art. An example storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples and additional elements may be added.

What is claimed is:

1. A method, comprising:
   determining one or more first transmit allocation parameters, including a first parameter that specifies allocated first frequency resources, for a first scheduled wireless transmission using a first radio technology;
   receiving an indication to conditionally defer the first scheduled wireless transmission based on an upcoming reception of wireless data using a second radio technology and second frequency resources; and
   determining whether to defer the first scheduled wireless transmission in order to avoid interference with the upcoming reception of wireless data, based on the first one or more transmit allocation parameters, including based on whether there is a threshold difference between the first frequency resources and the second frequency resources.

2. The method of claim 1, further comprising:
   determining to defer the first scheduled wireless transmission;
   determining one or more second transmit allocation parameters, including a second parameter that specifies allocated second frequency resources, for a second scheduled wireless transmission using the first radio technology;
   receiving an indication to conditionally defer the second scheduled wireless transmission based on an upcoming reception of wireless data using the second radio technology; and
   determining not to defer the second scheduled wireless transmission, based on the one or more second transmit allocation parameters.

3. The method of claim 1, wherein the one or more transmit allocation parameters further include: a transmit power for the first scheduled wireless transmission.

4. The method of claim 1, wherein the first radio technology comprises an LTE technology and the wireless transmission comprises an LTE wireless transmission, and wherein the second radio technology comprises a Wi-Fi technology and the wireless data comprises Wi-Fi data.

5. The method of claim 1, wherein the determining whether to defer the first scheduled wireless transmission includes:
   determining to defer the first scheduled wireless transmission in response to a number of resource blocks for the first scheduled wireless transmission comparing to a threshold number in a predetermined manner.

6. The method of claim 1, wherein the determining whether to defer the first scheduled wireless transmission includes determining to defer the first scheduled wireless transmission in response a frequency of a resource block for the transmission comparing to a threshold frequency in a predetermined manner.

7. The method of claim 1, wherein the threshold difference is dynamically determined.

8. The method of claim 1, further comprising determining to defer the first scheduled wireless transmission in response to a number of resource blocks for the first scheduled wireless transmission comparing to a threshold number in a predetermined manner, a frequency of a resource block for the first scheduled wireless transmission comparing to a threshold frequency in a predetermined manner, and a transmit power of the first scheduled wireless transmission comparing to a threshold power in a predetermined manner.

9. An apparatus, comprising:
   an LTE wireless processor configured to determine one or more LTE transmit allocation parameters for a first scheduled LTE transmission of data;
   a Wi-Fi wireless processor configure to prepare to receive Wi-Fi data;
   wherein the Wi-Fi wireless processor is further configured to request that the first scheduled LTE transmission be conditionally deferred based an upcoming reception of Wi-Fi data; and
   wherein the LTE wireless processor is further configured to determine whether to defer the first scheduled LTE transmission based at least on one or more first LTE transmit allocation parameters associated with the first scheduled LTE transmission, including based on whether there is a threshold difference between first frequency resources assigned for the scheduled LTE transmission and second frequency resources for the upcoming reception of Wi-Fi data.

10. The apparatus of claim 9, wherein the one or more LTE transmit allocation parameters further include: a transmit power and a number of resource blocks.

11. The apparatus of claim 9, wherein the apparatus is configured to dynamically determine the threshold difference.

12. The apparatus of claim 11, wherein the apparatus is further configured to:
   determine to defer the first scheduled LTE transmission based at least in part on the one or more first LTE transmit allocation parameters
   determine one or more second transmit allocation parameters, including a second parameter that specifies allocated second frequency resources, associated with a second scheduled LTE transmission;
   receive an indication to conditionally defer the second scheduled LTE transmission based on an upcoming reception of Wi-Fi data; and
   determine not to defer the second scheduled LTE transmission, based on the one or more second transmit allocation parameters.

13. A non-transitory computer-readable medium having instructions stored thereon that are executable by a computing device to perform operations comprising:
   determining one or more first transmit allocation parameters, including a first parameter that specifies allocated first frequency resources, for a first scheduled wireless transmission via a first radio technology;

receiving an indication to conditionally defer the first scheduled wireless transmission based on an upcoming reception of wireless data using a second radio technology; and determining whether to defer the first scheduled wireless transmission in order to avoid interference with the upcoming reception of wireless data, based at least on the first one or more transmit allocation parameters, including based on whether there is a threshold difference between first frequency resources assigned for the first scheduled wireless transmission and second frequency resources for the upcoming reception of wireless data.

14. The non-transitory computer-readable medium of claim 13, wherein the first radio technology comprises an LTE technology and the first scheduled wireless transmission comprises an LTE wireless transmission.

15. The non-transitory computer-readable medium of claim 13, wherein the one or more first transmit allocation parameters further include: a transmit power.

16. The non-transitory computer-readable medium of claim 13, wherein the second radio technology comprises a Wi-Fi technology and the wireless data comprises Wi-Fi data.

17. The non-transitory computer-readable medium of claim 13, wherein the determining whether to defer the first scheduled wireless transmission includes determining to defer the first scheduled wireless transmission in response to a number of resource blocks for the first scheduled wireless transmission comparing to a threshold number in a predetermined manner.

18. The non-transitory computer-readable medium of claim 13, wherein the determining whether to defer the first scheduled wireless transmission includes determining to defer the first scheduled wireless transmission in response a frequency of a resource block for the transmission comparing to a threshold frequency in a predetermined manner.

19. The non-transitory computer-readable medium of claim 13, wherein the operations further comprise:

comparing at least one transmit allocation parameter to a limit for the at least one transmit allocation parameter; and based at least in part on the comparison, deferring the first scheduled wireless transmission.

20. The non-transitory computer-readable medium of claim 19, wherein the operations further comprise:

determining to defer the first scheduled wireless transmission;

determining one or more second transmit allocation parameters, including a second parameter that specifies allocated second frequency resources, for a second scheduled wireless transmission using the first radio technology;

receiving an indication to conditionally defer the second scheduled wireless transmission based on an upcoming reception of wireless data using the second radio technology; and determining not to defer the second scheduled wireless transmission and performing the second scheduled wireless transmission, based on the one or more second transmit allocation parameters.

* * * * *